United States Patent
Yao et al.

(10) Patent No.: US 7,813,386 B2
(45) Date of Patent: Oct. 12, 2010

(54) OPTICAL FIBER FOR AN OPTICAL FIBER LASER, METHOD FOR FABRICATING THE SAME, AND OPTICAL FIBER LASER

(75) Inventors: Bing Yao, Hitachi (JP); Seiji Kojima, Hitachi (JP); Kazumasa Ohsono, Hitachi (JP); Akihito Hongo, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 104 days.

(21) Appl. No.: 12/219,696

(22) Filed: Jul. 25, 2008

(65) Prior Publication Data
US 2009/0080472 A1    Mar. 26, 2009

(30) Foreign Application Priority Data
Jul. 27, 2007    (JP)    ............... 2007-195573

(51) Int. Cl.
*H01S 3/30*    (2006.01)
(52) U.S. Cl. ............... 372/6; 385/123; 385/126
(58) Field of Classification Search ............ 372/6; 385/123–128
See application file for complete search history.

(56) References Cited

U.S. PATENT DOCUMENTS

| | | | | |
|---|---|---|---|---|
| 4,782,491 A | * | 11/1988 | Snitzer | ............ 372/6 |
| 5,710,786 A | * | 1/1998 | Mackechnie et al. | ........... 372/6 |
| 5,846,638 A | * | 12/1998 | Meissner | .......... 428/220 |
| 6,336,749 B1 | * | 1/2002 | O'Toole et al. | ............ 385/96 |

FOREIGN PATENT DOCUMENTS

JP        5-249328        9/1993

* cited by examiner

*Primary Examiner*—Armando Rodriguez
*Assistant Examiner*—Xnning Niu
(74) *Attorney, Agent, or Firm*—McGinn Intellectual Property Law Group, PLLC (57) ABSTRACT

The optical fiber 1 for an optical fiber laser is provided with a rare earth element doped core 2 doped with a rare earth element, and a cladding 3 formed at an outer periphery of the rare earth element doped core 2. In the optical fiber 1 for an optical fiber laser, the rare earth element doped core 2 is divided into a plurality of core regions $2a, 2b, \ldots, 2n-1, 2n$ along a longitudinal direction of the optical fiber 1 and dopant concentrations of the rare earth element in respective core regions $2a, 2b, \ldots, 2n-1, 2n$ are different from each other, in order to flatten a temperature distribution of the optical fiber 1 along the longitudinal direction.

16 Claims, 9 Drawing Sheets

OPTICAL FIBER FOR AN OPTICAL FIBER LASER, METHOD FOR FABRICATING THE SAME, AND OPTICAL FIBER LASER

The present application is based on Japanese Patent Application Nos. 2007-195573 filed on Jul. 27, 2007, the entire contents of which are incorporated herein by reference.

BACKGROUND OF THE INVENTION

1. Field of the Invention

The present invention relates to an optical fiber for an optical fiber laser, a method for fabricating the same, and an optical fiber laser, in more particular, to an optical fiber for a high output power optical fiber laser having a rare earth element doped core and a cladding, a method for fabricating the same, and an optical fiber laser.

Development of a less expensive light source with a higher output power has been required for laser processing, medical application, and the like. For these requirements, an optical fiber laser has been noted since it is possible to easily extract a laser light with high efficiency and high quality.

Figure 9:
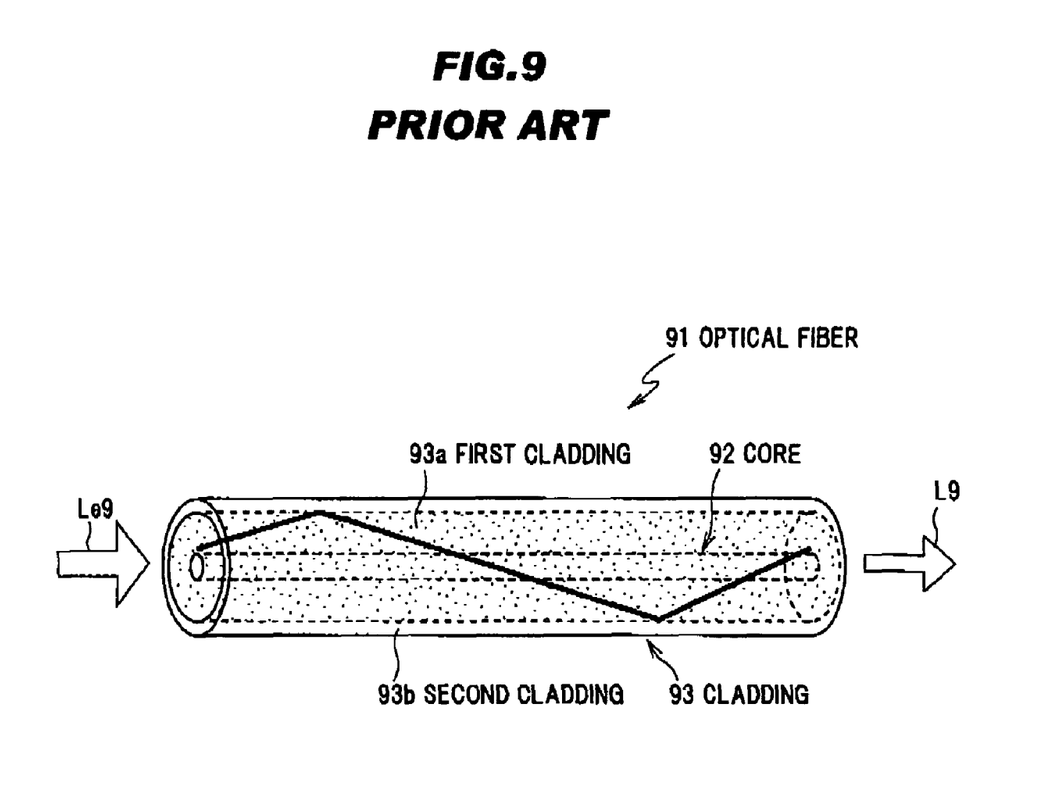
FIG. 9 is a schematic diagram of a conventional optical fiber for an optical fiber laser.

FIG. 9 shows an optical fiber 91 to be used for a high output power optical fiber laser. This optical fiber 91 is a double clad fiber comprising a core 92 doped with rare earth element such as Yb, Er, Er/Yb, Tm, Nd, and a cladding 93 comprising a first cladding 93a and a second cladding 93b. A coating layer (not shown) comprising UV curing resin or the like is provided at an outer periphery of the second cladding 93b.

A light outputted from a multimode laser diode (semiconductor laser) is input into an end (input end) of the optical fiber 91 as an exciting light Le9. The exciting light Le9 collected into the first cladding 93a is propagated though the optical fiber 91, thereby exciting the rare earth elements in the core 92. Then, the exciting light is propagated to the core 92 from the excited rare earth elements so that a high output power laser exciting light L9 is output from another end (output end) of the optical fiber 91.

2. Related Art

For example, Japanese Patent Laid-Open No. 5-249328 (JP-A-5-249328) discloses an example of the conventional optical fiber for an optical fiber laser having a rare earth element doped core divided into a plurality of core regions, in which regions doped with rare earth element in the respective core regions have different diameters.

However, when a Yb doped core is used as the core 92 in the conventional optical fiber 91, an optical conversion efficiency of the laser exciting light L9 to the exciting light Le9 is about 80%, and about 20% of energy is converted into heat.

Accordingly, in the conventional optical fiber 91, there is a disadvantage in that a temperature of the optical fiber 91 is increased in accordance with an increase in the output power of the optical fiber laser. In particular, since a temperature elevation of a part in vicinity of the input end of the optical fiber 91 is large, the coating layer of the optical fiber 91 may be damaged, so that the output of the optical fiber laser is limited.

In addition, there are limiting factors for the high output power optical fiber laser, such as non-linearity of the optical fiber, damage of the optical fiber, excitation method. Namely, in the conventional optical fiber, higher exciting light power is required in accordance with the increase in the output power of the optical fiber laser, so that an energy density in the double clad fiber is excessive, thereby causing the problems such as the heat generation in the optical fiber, the non-linearity of the optical fiber, the damage or breakdown of the optical fiber.

In actually commercialized optical fiber laser, it is required to remove the aforementioned limiting factors with a good balance.

SUMMARY OF THE INVENTION

Therefore, it is an object of the present invention to provide an optical fiber for an optical fiber laser, a method for fabricating the same, and an optical fiber laser, in which the temperature elevation of the optical fiber in the optical fiber laser can be suppressed and the output power of the optical fiber laser is increased.

According to a feature of the invention, an optical fiber for an optical fiber laser comprises:

a rare earth element doped core doped with a rare earth element, the rare earth element doped core being divided into a plurality of core regions along a longitudinal direction of the optical fiber, a dopant concentration of the rare earth element in each of the core regions being different from each other; and a cladding formed at an outer periphery of the rare earth element doped core;

wherein an exciting light is inputted into an end of the cladding to excite the rare earth element, thereby outputting a laser exciting light.

In the optical fiber for an optical fiber laser, it is preferable that dopant concentrations of the core regions are symmetrical with respect to a center part along the longitudinal direction of the optical fiber.

In the optical fiber for an optical fiber laser, it is preferable that lengths of the core regions are different from each other.

In the optical fiber for an optical fiber laser, it is preferable that a temperature along the longitudinal direction of the optical fiber in operation is not greater than 170° C.

In the optical fiber for an optical fiber laser, it is preferable that the core regions are provided as a combination of the rare earth element doped cores having a dopant concentration of either of 500 ppm, 700 ppm, and 1100 ppm.

In the optical fiber for an optical fiber laser, it is preferable that a diameter of the rare earth element doped core is constant along the longitudinal direction of the optical fiber.

In the optical fiber for an optical fiber laser, it is preferable that the dopant concentration of the rare earth element in each of the core regions is constant in an axial direction of the optical fiber.

In the optical fiber for an optical fiber laser, it is preferable that the dopant concentration of the rare earth element in each of the core regions is constant along the longitudinal direction of the optical fiber.

In the optical fiber for an optical fiber laser, it is preferable that a dopant concentration of the cladding is constant along the longitudinal direction of the optical fiber.

In the optical fiber for an optical fiber laser, it is preferable that a diameter of a rare earth element doped region in the rare earth element doped core is constant along the longitudinal direction of the optical fiber.

In the optical fiber for an optical fiber laser, it is preferable that the core regions are totally doped with the rare earth element and diameters of the core regions are equal to each other According to another feature of the invention, a method for fabricating an optical fiber for an optical fiber laser comprises:

preparing a plurality of divided optical fibers each of which comprising a rare earth element doped core doped with a rare earth element and a cladding formed at an outer periphery of the rare earth element doped core, a dopant concentration of the rare earth element of the rare earth element doped core of each of the optical fibers being different from each other; and fusion-bonding ends of the divided optical fiber with each other.

According to a still another feature of an optical fiber laser comprises:

an optical fiber comprising a rare earth element doped core doped with a rare earth element, the rare earth element doped core being divided into a plurality of core regions along a longitudinal direction of the optical fiber, a dopant concentration of the rare earth element in each of the core regions being different from each other, and a cladding formed at an outer periphery of the rare earth element doped core;

an optical coupler connected to an end of the optical fiber; and a plurality of light sources for inputting an exciting light to the cladding via the optical fiber to excite the rare earth element, thereby outputting a laser exciting light.

EFFECT OF THE INVENTION

According to the present invention, it is possible to easily control an optical absorption characteristic of the exciting light along a longitudinal direction of the optical fiber, and to flatten a temperature distribution along the longitudinal direction of the optical fiber.

BRIEF DESCRIPTION OF THE DRAWINGS

Next, preferred embodiments according to the present invention will be explained in conjunction with appended drawings, wherein:

FIGS. 4A to 4C are diagrams showing a comparison between a conventional optical fiber and the optical fiber for an optical fiber laser in the preferred embodiment according to the present invention, wherein

FIGS. 8A to 8C are explanatory diagrams showing an example of methods for fabricating the optical fiber for an optical fiber laser as shown in FIG. 1, wherein

DETAILED DESCRIPTION OF PREFERRED EMBODIMENT (Limiting Factors for The Optical Fiber Laser)

In searching and developing the optical fiber laser, the Inventors studied a thermal effect in the optical fiber, further, the non-linearity (a non-linear optical effect) of the optical fiber, the damage of the optical fiber, and the excitation method for the optical fiber laser. The Inventors further searched and developed the study for removing these four limiting (problem) factors with a good balance.

As to the thermal effect, the damage in the coating part of the optical fiber causes the break of the optical fiber, so that the optical conversion efficiency is decreased and the output power is decreased. So as to solve the above problem, it is possible to use a large diameter fiber, a holey cladding (cladding with air), a heat resistance coating, and the like.

Further, the non-linearity of the optical fiber causes saturation of the laser light output. So as to solve the above problem, it is possible to increase a mode field diameter (MFD), to shorten a length of the optical fiber, and the like.

Still further, the damage of the optical fiber may be for example a fiber fusing, a damage of an end surface of the optical fiber, and the like. So as to solve the above problem, it is possible to increase the MFD, to improve a glass structure, and the like.

In addition, there is a problem in that a heat concentration at the input end of the optical fiber may be caused in a certain excitation method. So as to solve the above problem, a side excitation method may be used.

Further, a bad influence on a beam quality due to non-uniformity of a refractive index of the core part may be also contemplated. However, it is contemplated that most of the current problems in the optical fiber for an optical fiber laser will be solved by removing the aforementioned limiting factors with the good balance. The Inventors achieved the present invention as a result of sincere studies based on the above contemplation.

(Preferred Embodiment)

Next, a preferred embodiment according to the present invention will be explained in more detail in conjunction with the appended drawings.

(Structure of an Optical Fiber Laser)

Firstly, with referring to FIG. 7, an optical fiber laser using an optical fiber for an optical fiber laser in a preferred embodiment according to the invention will be explained.

Figure 1:
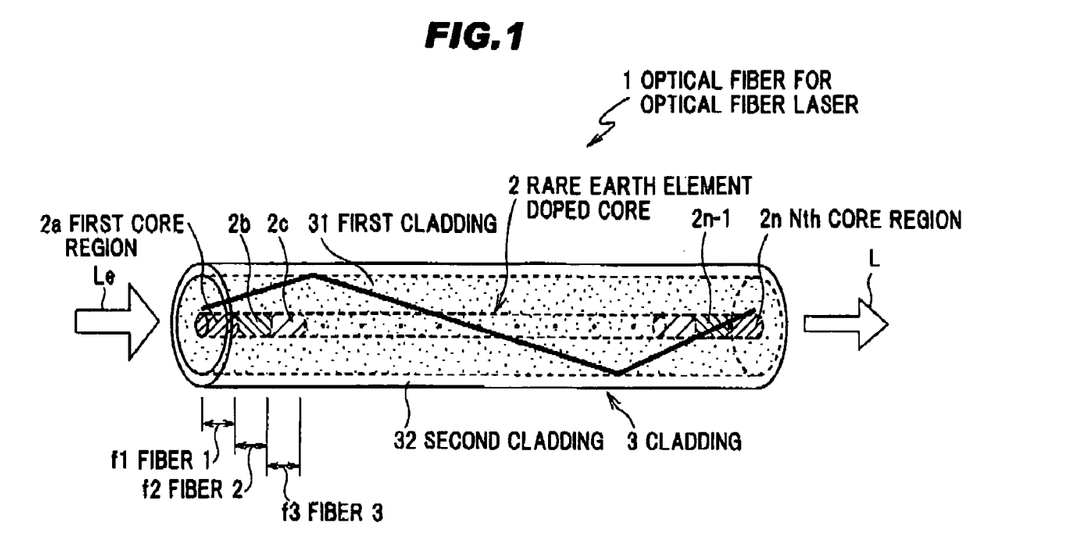
FIG. 1 is a schematic diagram of an optical fiber for an optical fiber laser in a preferred embodiment according to the present invention.
Figure 7:
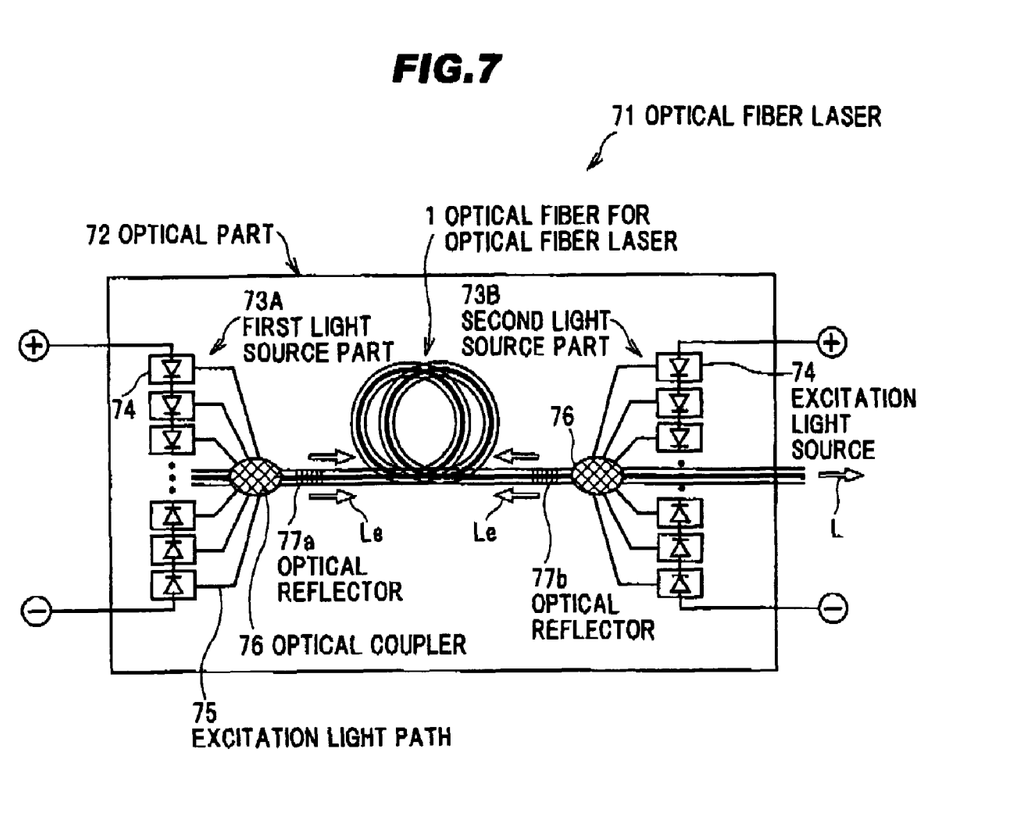
FIG. 7 is a schematic diagram of an optical fiber laser using the optical fiber for an optical fiber laser as shown in FIG. 1.

FIG. 7 is a schematic diagram of the optical fiber laser using the optical fiber for an optical fiber laser as shown in FIG. 1.

As shown in FIG. 7, an optical fiber laser 71 in a preferred embodiment according to the invention comprises an optical part 72 having a light source for outputting a laser exciting light L, and driving unit such as a laser diode (LD) driver (not shown) that is connected to the optical part 72 for driving the light source.

The optical part 72 comprises an optical fiber 1 for an optical fiber laser in the preferred embodiment, and first and second light source parts 73A and 73B provided respectively in vicinity (however, at regions outer than both optical couplers 76, 76 as described later) of both ends of the optical fiber 1 for an optical fiber laser.

The first light source part 73A comprises a plurality of excitation light sources 74 for outputting an excitation light with a high output power, a plurality of excitation light paths 75 respectively connected to the excitation light sources 74, and an optical coupler 76 optically connected to the excitation light paths 75 for optically coupling an output light from each of the excitation light sources 74 to the optical fiber 1 for an optical fiber laser.

Similarly, the second light source part 73B comprises a plurality of excitation light sources 74 for outputting an excitation light with a high output power, a plurality of excitation light paths 75 respectively connected to the excitation light sources 74, and an optical coupler 76 optically connected to the excitation light paths 75 for optically coupling an output light from each of the excitation light sources 74 to the optical fiber 1 for an optical fiber laser.

As each of the excitation light source 74, it is preferable to use a multimode laser diode (LD) that is suitable for optical transmission and is not expensive. In this preferred embodiment, a multimode laser diode which emits an exciting light Le with a wavelength $\lambda e$ (915 nm or 975 to 980 nm) is used as an example.

The respective excitation light sources 74 are connected in series for each of the first and second light sources parts 73A, 73B that are connected to the aforementioned driving units. As described above, a multimode optical fiber, an optical waveguide or the like may be used as each of the excitation light paths 75. As the optical coupler 76, a multi coupler, an excitation combiner or the like may be used.

At both ends of the optical fiber 1 for an optical fiber laser, optical reflectors 77a, 77b for reflection excitation of the exciting light Ire incident on the optical fiber 1 for an optical fiber laser are provided at regions inner than the both optical couplers 76, 76. In this preferred embodiment, two fiber Bragg gratings (FBG) having a transmissivity with respect to an exciting light wavelength and a high reflective index with respect to a laser light wavelength are provided for the optical fiber 1 for an optical fiber laser, to provide two optical reflectors 77a, 77b.

The FBG provided as the optical reflector 77b (at an emitting side of the laser light L of optical fiber 1 for optical fiber laser) is formed to have a lattice spacing different from that of another FBG provided as the optical reflector 77a, so as to partially reflect back the laser exciting light.

(Structure of an Optical Fiber for an Optical Fiber Laser)

FIG. 1 is a schematic diagram of an optical fiber for an optical fiber laser in the preferred embodiment according to the present invention.

As shown in FIG. 1, an optical fiber 1 for an optical fiber laser in the preferred embodiment according to the present invention has a light emitting function for emitting a light by a predetermined excitation, and functions as a laser excitation medium by the reflection excitation of the emitted light.

The optical fiber 1 for an optical fiber laser comprises a rare earth element doped core 2 doped with a rare earth element, and a cladding 3 formed at an outer periphery of the rare earth element doped core 2.

The rare earth element doped core 2 comprises a pure quartz doped with a micro amount of the rare earth element such as Yb, Er, Er/Yb, Tm, Nd and the like. In the preferred embodiment, the exciting light Le has a wavelength $\lambda e$ (915 nm or 975 to 980 nm), and Yb is used as the rare earth element for outputting the laser light L with a wavelength $\lambda$ (1030 to 1100 nm). Yb is the rare earth element which is suitable for absorbing the exciting light Le with the wavelength $\lambda e$ and for amplification (stimulated emission) of the light with the wavelength $\lambda$.

In the optical fiber 1 for an optical fiber laser, the rare earth element doped core 2 is divided into a plurality of core regions $2a, 2b, \ldots, 2n-1, 2n$ along a longitudinal direction of the optical fiber 1 and dopant concentrations of the rare earth element in respective core regions $2a, 2b, \ldots, 2n-1, 2n$ are different from each other, in order to flatten a temperature distribution of the optical fiber 1 along the longitudinal direction.

Herein, a diameter of the rare earth element doped core 2 is constant along the longitudinal direction of the optical fiber 1. Namely, core diameters of the respective core regions $2a, 2b, \ldots, 2n-1, 2n$ are equal to each other.

Further, a diameter of a region doped with the rare earth element in the rare earth element doped core 2 is constant along the longitudinal direction of the optical fiber 1. Each of the core regions $2a, 2b, \ldots, 2n-1, 2n$ may be totally doped with the rare earth element.

Still Further, mode field diameters of the respective core regions $2a, 2b, \ldots, 2n-1, 2n$ are equal to each other, so as to decrease a connection loss.

In addition, the dopant concentration of the rare earth element in the rare earth element doped core 2 may be constant in an axial direction of the optical fiber 1. Namely, the dopant concentration of the rare earth element of each of the core regions $2a, 2b, \ldots, 2n-1, 2n$ is constant in the axial direction of the optical fiber 1.

Further, the dopant concentration of the rare earth element in each of the core regions $2a, 2b, \ldots, 2n-1, 2n$ is constant along the longitudinal direction of the optical fiber 1. Therefore, the dopant concentration of the rare earth element of the core regions $2a, 2b, 2n-1, 2n$ is varied in step-like manner along the longitudinal direction of the optical fiber 1.

In the optical fiber 1 for an optical fiber laser shown in FIG. 1, the dopant concentrations of the core regions $2a$ and $2n$ are the lowest, and the dopant concentration is increased gradually across the core regions from the both ends to a center of the optical fiber longitudinal direction. Namely, the dopant concentrations in the core regions $2b$ and $2n-1$ are higher than those in the core regions $2a$ and $2n$, respectively. As a result, the dopant concentrations in the core regions $2a, 2b, \ldots, 2n-1, 2n$ are symmetrical with respect to a center part of the optical fiber longitudinal direction, namely, a dopant concentration distribution is line-symmetrical.

Figure 4A:
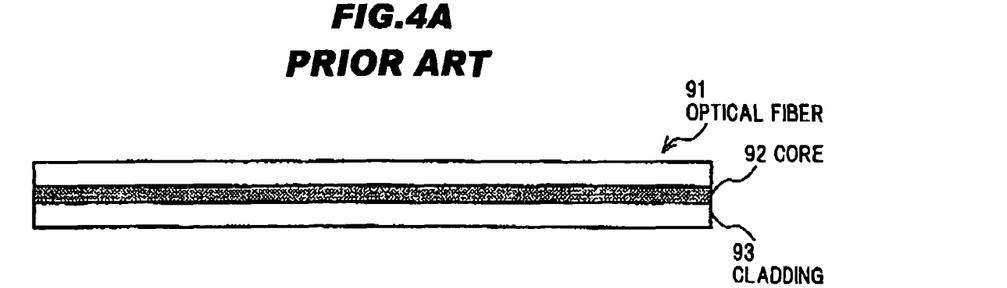
FIG. 4A is a longitudinal cross sectional view of the conventional optical fiber.
Figure 4B:
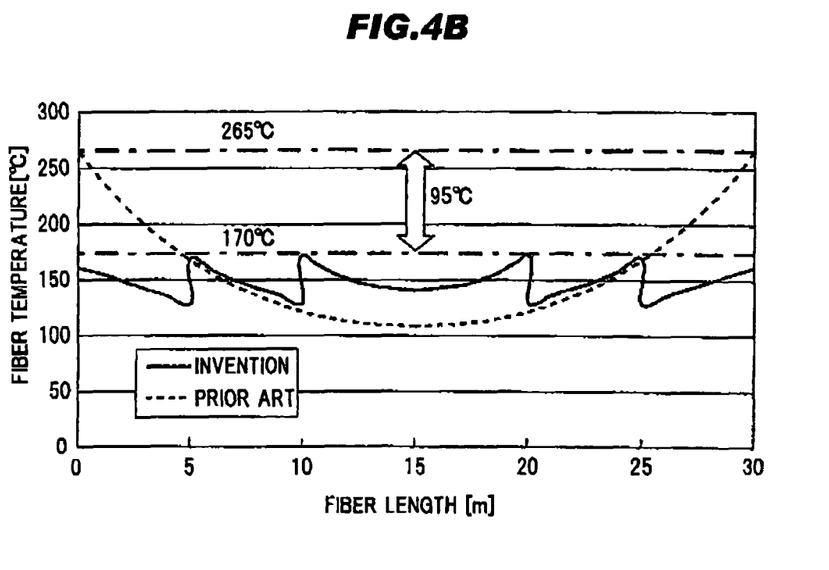
FIG. 4B is a table of graphs showing the thermal analysis of the conventional optical fiber and the optical fiber for an optical fiber laser in the preferred embodiment according to the invention.
Figure 4C:
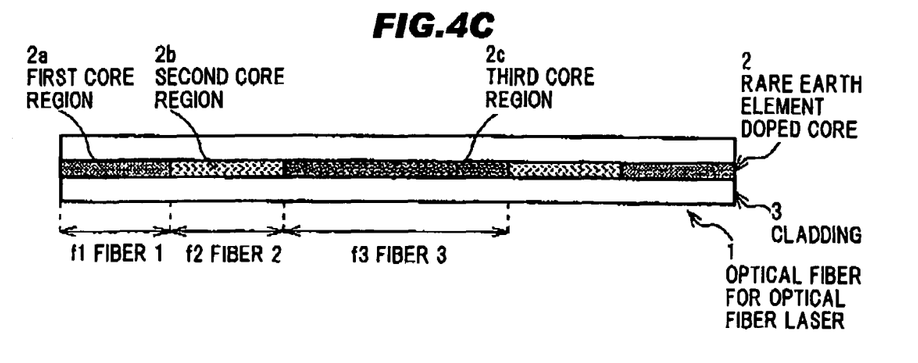
FIG. 4C is a longitudinal cross sectional view of the optical fiber for an optical fiber laser in the preferred embodiment according to the invention.

Further, as shown in FIG. 4, lengths of the respective core regions $2a, 2b, \ldots, 2n-1, 2n$ may be varied from each other. Namely, the lengths of the core regions may be partially different from each other.

In these cases the optical fiber 1 for an optical fiber laser may be applied to not only a generally used optical fiber laser to which the exciting light Le is inputted from only one side, but also an optical fiber laser 71 to which the exciting light Le is inputted from both sides as shown in FIG. 7.

The cladding 3 is a double clad type cladding comprising a first cladding 31 mainly composed of a quartz material which is provided at an inner side as a pumping guide, and a second cladding 32 mainly composed of a quartz material.

In this preferred embodiment, the first cladding 31 has a photonic crystal structure in which a plurality of holes provided along the optical fiber longitudinal direction are arranged in a honeycomb shape, to provide a photonic crystal fiber (PCF) by the rare earth element doped core 2 and the cladding 3.

In place of using the PCF structure, at least one of the first cladding 31 and the second cladding 32 of the cladding 3 may be doped with dopant If the cladding 3 is doped, a dopant concentration of the cladding 3 should be constant along the optical fiber longitudinal direction.

(Theoretical Basis for Designing the Optical Fiber 1)

Next, an example of the optical fiber 1 for an optical fiber laser will be explained in more detail.

Concerning the excitation method, the present invention is not limited to particular excitation method. Either of the side excitation and the end excitation may be applied to the optical fiber laser 71 as shown in FIG. 7.

Figure 3:
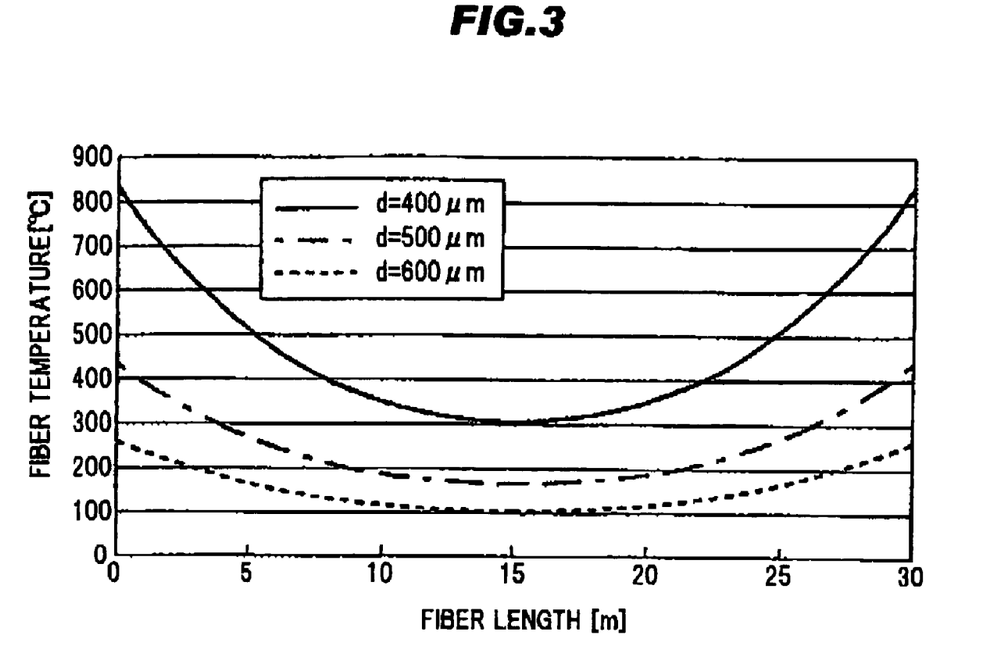
FIG. 3 is a table of graphs showing an example of thermal analysis of a conventional optical fiber.

FIG. 3 is a table of graphs showing an example of thermal analyses of a conventional optical fiber.

Firstly, the thermal analysis at the time of operation of the conventional optical fiber 91 was conducted. The analysis result is shown in FIG. 3.

In the thermal analysis, a multimode laser diode with a wavelength of 977 nm and an output power of 6.5 kW is used as the excitation light source 74, a diameter of the rare earth element doped core 2 is 50 µm, a diameter of the first cladding 31 including the rare earth element doped core 2 is d µm (d is a variable), a concentration of Yb added to the core is 1000 ppm, an absorption loss of the exciting light Le (at a wavelength of 977 nm) is 0.5 dB/m, and a diameter of the second cladding 32 including the first cladding 31 and the rare earth element doped core 2 is (d+100) nm.

As shown in FIG. 3, in the conventional optical fiber 91, a fiber temperature is increased in vicinity of the both ends of the optical fiber 91. For example, the fiber temperature is very high, namely about 265° C. at the both ends, even if the diameter d of the first cladding 31 including the rare earth element doped core 2 is increased until 600 µm.

It is supposed that it is possible to lower the temperature of the optical fiber and average the heat, by merely increasing a total fiber length. However, in this case, it is impossible to realize the high output power due to influence of the nonlinear optical effect.

Accordingly, the Inventors studied stimulated Raman scattering (SRS) in the optical fiber and stimulated Brillouin scattering (SBS) in the optical fiber that are the nonlinear optical effects in order to take into account the fiber nonlinearity.

Herein, the stimulated Raman scattering is a scattering caused by an interaction between an incident light and an optical phonon (optical vibration of a crystal grating) generated by the incident light, when the light is incident on a medium. A scattering light generated by the stimulated Raman scattering is also called as Stokes (scattering) light. It is observed that the stimulated Raman scattering generates equal amounts of the Stokes lights for forward and back scattering. SRS threshold $P_{thr}$ that is an optical fiber nonlinearity threshold is expressed by formula (1) as follows:

$$P_{thr} = \frac{16 A_{eff}}{g_R L_{eff}} \quad (1)$$

Wherein $A_{eff}$ is an effective sectional area, $L_{eff}$ is a fiber effective length, and $g_R$ is a Raman gain coefficient.

Based on the formula (1), the heat generated in the optical fiber is increased in accordance with an increase in input power of the light input to the laser diode, so that a peak may appear in a band other than the band to be used. Since the output power of the optical fiber laser will be negatively affected by this effect, it is necessary to suppress the influence of the heat while increasing the input power.

The stimulated Brillouin scattering is a scattering caused by an interaction between an incident light and an acoustic wave (acoustic vibration of the crystal grating) passing through a medium, when the light is incident on the medium. A Stokes light generated by the stimulated Brillouin scattering is only a back scattering light. SBS threshold $P_{thb}$ that is also an optical fiber nonlinearity threshold is expressed by formula (2) as follows:

$$P_{thb} = \frac{21 A_{eff}}{g_B L_{eff}} \left( 1 + \frac{\Delta V_P}{\Delta V_B} \right) \quad (2)$$

Wherein $A_{eff}$ is an effective sectional area, $L_{eff}$ is a fiber effective length, $g_B$ is a Brillouin gain coefficient, $\Delta V_B$ is a Brillouin gain spectrum width, and $\Delta V_P$ is a pumping light spectrum width.

Based on the formula (2), a reflecting light intensity may be increased in accordance with an increase in input light intensity. As a result, a transmitting light intensity is saturated so that saturation of the output power is caused. As a practical matter, since the influence of SRS is sufficiently greater than the influence of SBS, it is enough to mainly consider a threshold for SRS generation.

Further, based on the formulas (1) and (2), it is understood that the thresholds of the SRS generation and the SBS generation are respectively proportional with the effective sectional area of the core of the optical fiber, and inversely proportional to the fiber effective length. In other words, it is necessary to provide the effective sectional area of the optical fiber as large as possible and to provide the fiber effective length as short as possible, in order to suppress the SRS generation and the SBS generation.

A damage threshold of a simple glass member is 3 GW/cm² (30 W/µm²). However, it is known that the damage threshold is lowered when a processing (including addition of dopant) is conducted on the optical fiber. For example, the MFD should be not less than 36 µm in an optical fiber with an output power of 10 kW.

Figure 2:
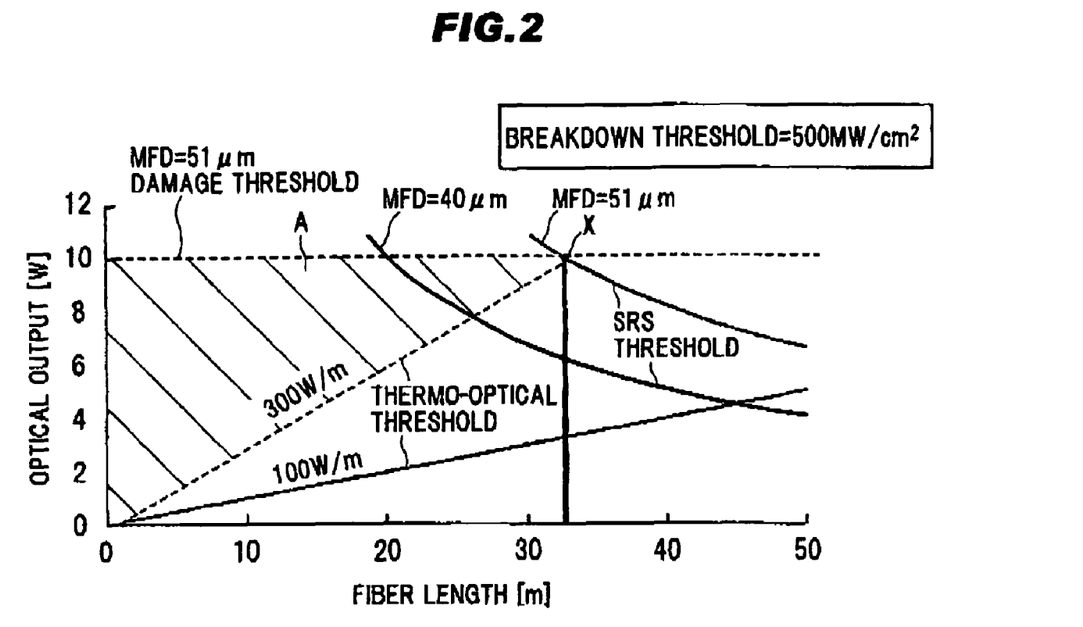
FIG. 2 is a table of graphs showing an example of limiting factors for the optical fiber for an optical fiber laser.

FIG. 2 is a table of graphs showing an example of limiting factors for the optical fiber for an optical fiber laser.

The example of the limiting factors for the optical fiber for an optical fiber laser is totally shown in FIG. 2 for the case that the damage threshold of the core part glass is 500 MW/cm². As shown in FIG. 2, it is required that the MFD of the optical fiber should be not less than 51 µm (MFD≧51 µm, namely $A_{eff}$≧1000 nm²) to realize the output power of 10 kW, Further, in the optical fiber having the MFD of 51 µm (MFD=51 µm), it is required that the fiber length is shorter than about 33 m, preferably not longer than about 30 m, in order to suppress the SRS. Still further, it is required that an extract output power is not less than 300 W/m (≧300 W/m) with considering the issue of thermo-optics (thermo-optical threshold).

Therefore, in the invention, the optical fiber 1 for an optical fiber laser of FIG. 1 is designed such that respective properties of the optical fiber are provided at a point X (at an intersection of the SRS threshold, the thermo optical threshold, and the damage threshold) in FIG. 2, in order to realize the output power of 10 kW within a hatched area A in FIG. 2.

With considering the aforementioned points, in the optical fiber 1 for an optical fiber laser in the preferred embodiment according to the invention, respective lengths of the core regions 2a, 2b, . . . , 2n−1, 2n along the longitudinal direction are preferably different from each other, and preferably about 5 m. The output power is not less than 5 kW, and preferably not less than 10 kW. The temperature distribution along the longitudinal direction at the time of the use (operation) is preferably not higher than 170° C. across an overall length of the optical fiber.

(Comparison Between a Conventional Optical Fiber and the Optical Fiber 1)

FIGS. 4A to 4C are diagrams showing a comparison between a conventional optical fiber and the optical fiber for an optical fiber laser in the preferred embodiment according to the present invention, in which FIG. 4A is a longitudinal cross sectional view of the conventional optical fiber, FIG. 4B is a table of graphs showing the thermal analysis of the conventional optical fiber and the optical fiber for an optical fiber laser in the preferred embodiment according to the invention, and FIG. 4C is a longitudinal cross sectional view of the optical fiber for an optical fiber laser in the preferred embodiment according to the invention.

As shown in FIG. 4C, the optical fiber 1 for an optical fiber laser comprises five core regions in total including two first core regions 2a, two second core regions 2b, and a third core region 2c. A length of each of the first core regions 2a and the second core regions 2b is about 5 m and a length of the third core region 2c is about 10 m.

Figure 5:
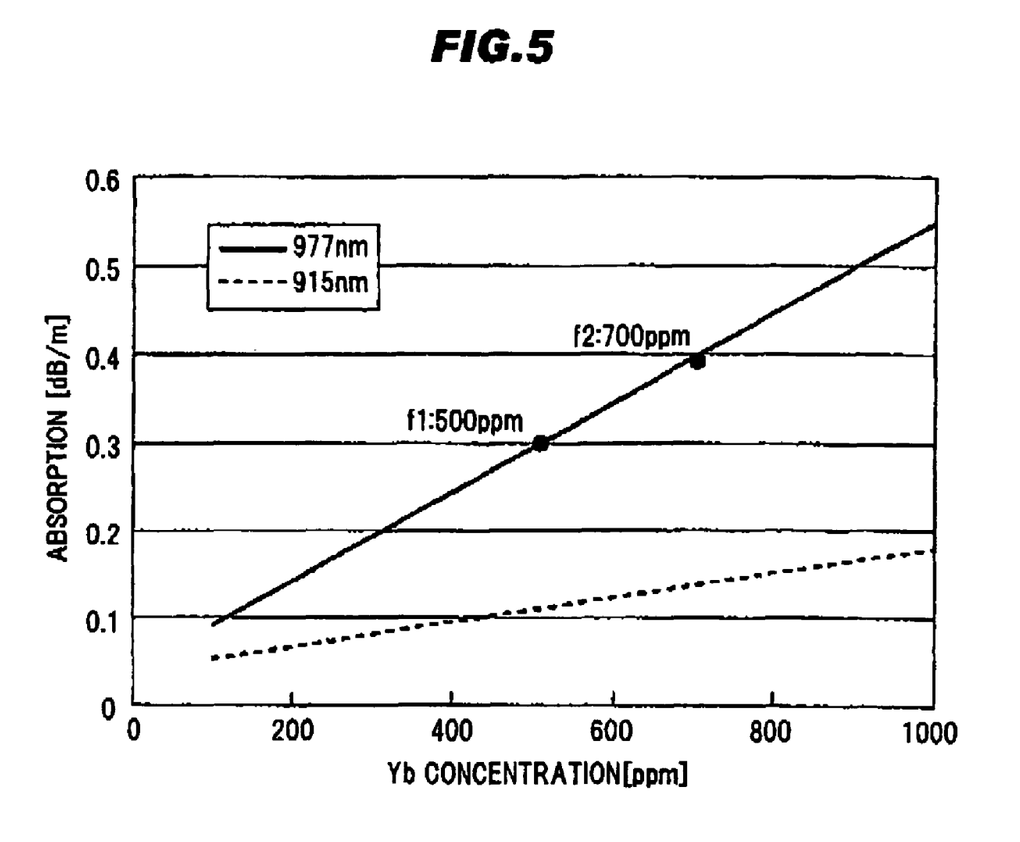
FIG. 5 is a table of graphs showing relationship between Yb concentration and an absorption loss and an example of Yb concentration in a first core region and a second core region in the optical fiber for an optical fiber laser in the preferred embodiment according to the invention.
Figure 6:
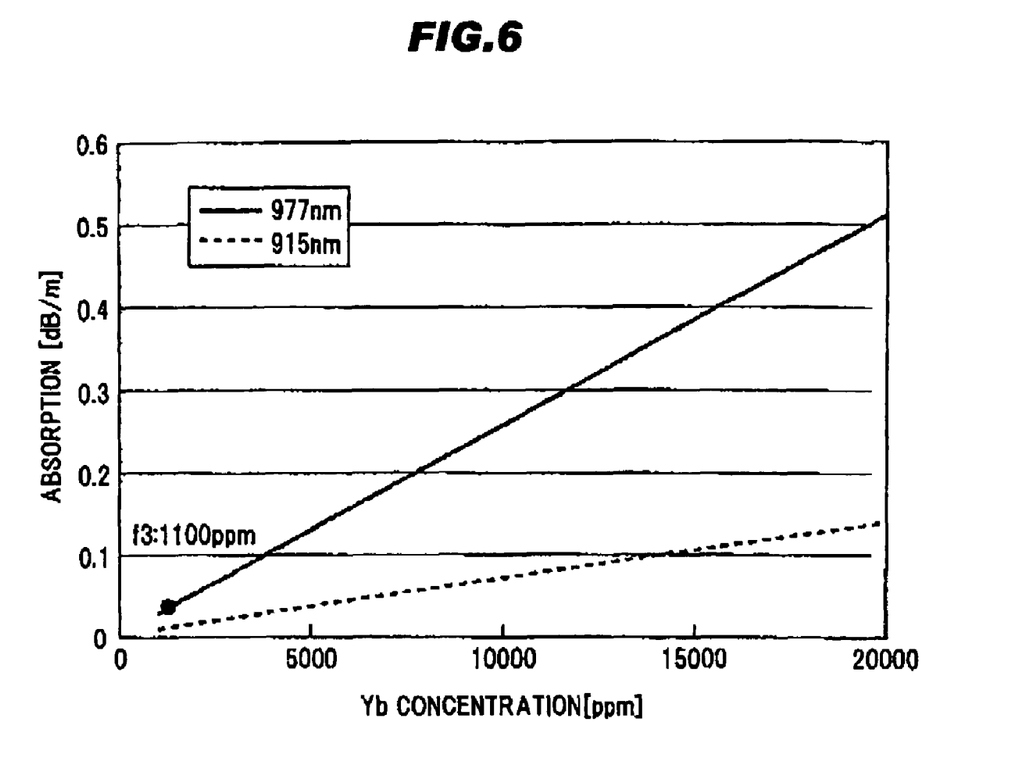
FIG. 6 is a table of graphs showing relationship between Yb concentration and an absorption loss and an example of Yb concentration in a third core region in the optical fiber for an optical fiber laser in the preferred embodiment according to the invention.

Further, in the present invention, with considering the Yb concentration and the absorption loss (absorption characteristic) shown in FIGS. 5 and 6, the respective core regions 2a, 2b, ..., 2n–1, 2n of the optical fiber 1 for an optical fiber laser are provided as a combination of the rare earth element doped cores having a dopant concentration of either of 500 ppm, 700 ppm, and 1100 ppm.

In the preferred embodiment, the Yb concentration of the first core region 2a is 500 ppm, the Yb concentration of the second core region 2b is 700 ppm, and the Yb concentration of the third core region 2c is 1100 ppm.

When an excitation light with a wavelength of 975 to 980 nm is inputted to the optical fiber 1 for an optical fiber laser manufactured to satisfy these conditions, the thermal characteristics thereof are as shown in FIG. 4B. Therefore, the optical fiber 1 for an optical fiber laser in the preferred embodiment has the characteristics that the output power is not less than 10 kW and the fiber temperature at the time of the operation is not higher than 170° C. across the overall length of the optical fiber 1.

In following explanation, parts of the optical fiber 1 for an optical fiber laser including each of the first to third core regions 2a to 2c are referred as a fiber 1 (f1), a fiber 2 (f2), and a fiber 3 (f3), respectively.

The absorption loss at the wavelength of 977 nm is 0.3 dB/m in the fiber 1, 0.4 dB/m in the fiber 2, and 0.3 dB/m in the fiber 3, respectively. For using the optical fiber 1 for an optical fiber laser of FIG. 4C in the optical fiber laser 71 of FIG. 7, it is enough to connect the optical couplers 76, 76 respectively at the both ends of the optical fiber 1 for an optical fiber laser.

FIG. 4B shows the thermal characteristics of the conventional optical fiber 91 shown in FIG. 4A by a dotted line for comparing the thermal characteristics of the optical fiber 1 shown in FIG. 4C with the conventional optical fiber 91.

The optical fiber 91 shown in FIG. 4A comprises the fiber 3 (f3) across the overall length of the optical fiber 91. The thermal characteristic of the optical fiber 91 (d=600 μm) is also indicated by the dotted line in FIG. 3.

In addition, the core diameter and the cladding diameter of the optical fiber 1 for an optical fiber laser are equal to those of the optical fiber 91.

It is understood from FIG. 4B that the temperature distribution along the longitudinal direction of the optical fiber 1 for an optical fiber laser at the time of the use is not higher than 170° C. for the overall length of the optical fiber 1. On the other hand, the fiber temperature of the conventional optical fiber 91 is not higher than 170° C. in vicinity of the central portion, however, the fiber temperature is extremely high, i.e. about 265° C. at the both ends that are input parts for the excitation light in vicinity of the light sources.

(Method for Fabricating the Optical Fiber 1 for an Optical Fiber Laser)

Next, an example of methods for fabricating the optical fiber 1 for an optical fiber laser will be explained below.

Firstly, a small diameter quartz stick, a plurality of small diameter quartz tubes, and a quartz jacket are manufactured. The small diameter quartz stick to be provided as the rare earth element doped core 2 after a preform (base material) drawing is disposed at a center part. A plurality of the small diameter quartz tubes, each of which has a diameter equal to that of the smaller diameter quartz stick, are arranged around the small diameter quartz stick, to provide a honeycomb shape photonic crystal which is provided as the first cladding 31 after preform drawing. The small diameter quartz stick and the small diameter quartz tubes are inserted into the quartz jacket tube.

The small diameter quartz stick is manufactured as follows. Firstly, a quartz rod doped with Yb is manufactured by MCVD (Modified Chemical Vapor Deposition) method with the use of a source gas and an oxy-hydrogen burner. Yb is one of the rare earth elements, and $Yb(DPM)_3$ is used as a source of Yb, and DPM means dipivaloylmethanato, for example.

The small diameter quartz rod is heat-treated in a predetermined atmosphere (for example, in a mixed gas of He at a flow rate of 10 l/min and $Cl_2$ at a flow rate of 200 cc/min) at a predetermined temperature (for example, about 1500° C.), thereafter is drawn by a method similar to that for drawing the conventional optical fiber, so as to provide the small diameter quartz stick.

Three kinds of the small diameter quartz sticks in which the Yb concentration is 500 ppm, 700 ppm, and 1100 ppm, respectively, in order to manufacture the fiber 1 to the fiber 3.

In addition, the small diameter quartz tube is manufactured by heat-treating and drawing a commercial synthetic quarts tube (for example, F300 made by Shin-Etsu Quartz Products, Co., Ltd.) by the method similar to the method of manufacturing the small diameter quartz stick.

The small diameter quartz stick and small diameter quartz tubes obtained by the aforementioned process are then cut to have a predetermined length respectively. Both ends of the small diameter quartz tube are sealed at the time of this cutting process. Thereafter, large dusts such as fragments are washed away by using running water and ultrasonic cleaning is conducted by using an ethanol, so as to remove dirt or dust attached to a surface of each cutting part. After having washed away the dirt or dust isolated from the surface of the cutting part by using pure water, an acid cleaning is conducted by using a fluorinated acid of 1 to 2%, to provide surface finish.

Thereafter, the small diameter quartz stick and a plurality of the small diameter quartz tubes which are bundled up around the small diameter quartz stick are inserted into the quartz jacket tube, to manufacture a PCF (photonic crystal fiber) preform. At this time, it is preferable that the insertion of the small diameter quartz stick and the small diameter quartz tubes into the quartz jacket tube is conducted while giving a micro vibration by an ultrasonic wave in a pure water, so that the small diameter quart tubes are not overlapped with each other and that both ends of the small diameter quartz tubes are aligned at same positions.

In concrete, the quartz jacket tube having a predetermined dimension is put up diagonally in an ultrasonic washer containing pure water, the small diameter quartz stick and the small diameter quartz tubes are sequentially arranged in the quartz jacket tube, so as to manufacture the PCF preform. Since a longitudinal dimensional accuracy of the quartz jacket tube greatly influences a quality of this arrangement, an inner diameter variation of the quartz jacket tube is adjusted to fall within a range of −0.1 mm to +0.1 mm.

The PCF perform thus obtained is put in a drying container, and moisture attached to the PCF perform is evaporated and dried, thereafter dehydration process is conducted. This dehydration process is conducted by vacuum-drawing the PCF perform in a vacuum chamber with the use of an oil hydraulic rotary vacuum pump.

After quartz dummy tubes are fusion-bonded to both ends of the quartz jacket tube in the PCF perform, $Cl_2$ and $O_2$ are introduced at a predetermined proportion (for example, $Cl_2$ at a flow rate of 200 cc/min and $O_2$ at a flow rate of 50 cc/min, or $Cl_2$ at a flow rate of 20 cc/min and $O_2$ at a flow rate of 50 cc/min) into the quartz jacket tube from a quartz dummy tube side, and exhausted from another quartz dummy tube side at a predetermined proportion (for example, a proportion of about 80 Pa (0.6 Torr)/min), so that elements inside the quartz jacket tube are substituted with $Cl_2$ and $O_2$ for a predetermined time.

Further, $C_2F_6$ is introduced at a predetermined proportion (for example, at a flow rate of 20 cc/min), and the PCF perform is hated by using the oxy-hydrogen burner while keeping a pressure in the PCF perform at constant (for example, about 73 Pa (0.55 Torr)). As described above, a surface etching process is conducted on the small diameter quartz stick, the small diameter quartz tubes and the quartz jacket tube, while conducting the dehydration process of the quartz jacket tube.

After conducting the surface etching and dehydration processes, the quartz dummy tubes are sealed while introducing $Cl_2$ and $O_2$ from the quartz dummy tube side. Thereafter, the PCF perform is heated by means of the oxy-hydrogen burner again, so that the small diameter quartz stick, the small diameter quartz tubes and the quartz jacket tube are fusion-bond and integrated with each other.

Thereafter, the fusion-bonded and integrated PCF perform is drawn to have a predetermined fiber diameter (an outer diameter $\phi$) by a drawing process for a conventional optical fiber. Further, the PCF preform is coated with an ultraviolet ray (UV) curing resin in the same (seamless) manufacturing line. As a result, a PCF provided with the rare earth element doped core 2 in which a center part is doped with Yb, and a cladding 3 provided at an outer periphery of the rare earth element doped core 2, in which holes are formed with a honeycomb shape periodic structure.

According to the aforementioned process for manufacturing the PCF, three kinds of PCFs in which the Yb concentration of the rare earth element doped core 2 is 500 ppm, 700 ppm, and 1100 ppm, respectively. These PCFs are provided as the fiber 1 (f1) to the fiber 3 (f3) that are three-divided fibers.

After each of the fiber 1 (f1) to fiber 3 (f3) having different Yb concentrations is cut to have a desired length, ends of the fiber 1 (f1) to fiber 3 (f3) are connected to each other by fusion-bonding, so as to provide the optical fiber 1 for an optical fiber laser in the preferred embodiment according to the invention.

Figure 8A:
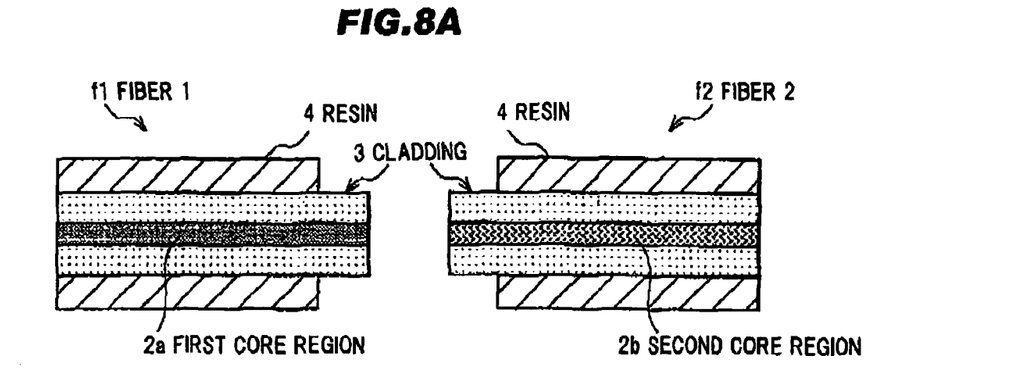
FIG. 8A shows lateral cross sectional views of two optical fibers.
Figure 8B:
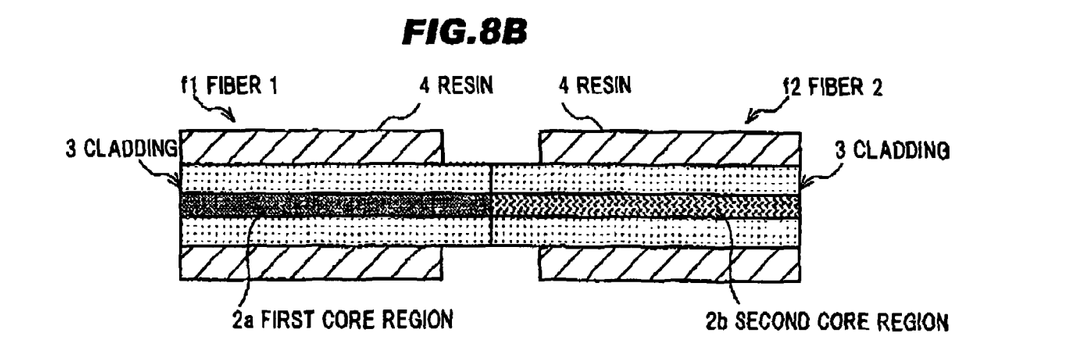
FIG. 8B shows the lateral cross sectional views of the two optical fibers abutted to each other.
Figure 8C:
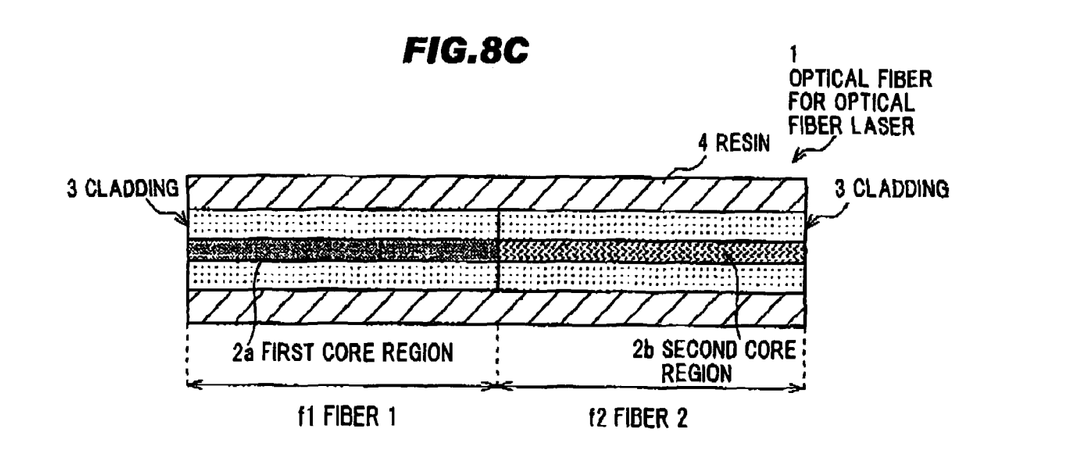
FIG. 8C shows the lateral cross sectional view of the two optical fibers fused to each other.

FIGS. 8A to 8C are explanatory diagrams showing an example of methods for fabricating the optical fiber for an optical fiber laser as shown in FIG. 1, wherein FIG. 8A shows lateral cross sectional views of two optical fibers, FIG. 8B shows the lateral cross sectional views of the two optical fibers abutted to each other, and FIG. 8C shows the lateral cross sectional view of the two optical fibers fused to each other.

In more detail, for example, only a UV curing resin 4 at only one of the end portions of the fiber 1 (f1) cut with a length of about 5 m is removed as shown in FIG. 8A. To the end portion of the fiber 1 (f1) from which the UV curing resin 4 is removed, an end portion of the fiber 2 (f2) with a length of about 5 m from which the UV curing resin 4 is similarly removed is fusion-bonded by using a fusion-bonding apparatus as shown in FIG. 8B. Thereafter, the end portions of the fiber 1 (f1) and the fiber 2 (f2) from which the UV curing resin 4 is removed are re-coated with the UV curing resin 4 as shown in FIG. 8C. By using the connecting process, the fiber 1 (f1), fiber 2 (f2), and fiber 3 (f3) are connected to each other, to provide the optical fiber 1 for an optical fiber laser, an overall length of which is about 30 m.

(Operation of the Optical Fiber Laser 71)

Next, function and effect of the preferred embodiment according to the invention will be explained along with the operation of the optical fiber laser 71 of FIG. 7.

When the excitation light source 74 is driven by the driving units, the exciting light is emitted from the excitation light source 74. The exciting light from all the excitation light sources 74 in the first and second light source parts 73A and 73B are optically coupled with each other at each of the optical couplers 76, 76, so that the exciting light Le is input to the optical fiber 1 for an optical fiber laser from both sides.

The inputted exciting light Le is amplified in the optical fiber 1 for an optical fiber laser. Further, the optical reflectors 77a, 77b function as total reflection mirrors and output mirrors of a laser resonator, so that a laser exciting light L with a high output power is generated and outputted from an output end of the optical fiber 1 for an optical fiber laser.

In the optical fiber 1 for an optical fiber laser, the rare earth element doped core 2 is divided into a plurality of the core regions $2a, 2b, \ldots, 2n-1, 2n$ along the longitudinal direction of the optical fiber 1 and the dopant concentrations of the rare earth element in respective core regions $2a, 2b, \ldots, 2n-1, 2n$ are different from each other, in order to flatten a temperature distribution of the optical fiber 1 along the longitudinal direction.

The absorption characteristic of the rare earth element doped fiber largely depends upon the dopant concentration. Therefore, by controlling the dopant concentrations of the rare earth element in respective core regions $2a, 2b, \ldots, 2n-1, 2n$ to be different from each other along the longitudinal direction of the optical fiber 1, it is possible to suppress the heat generation due to the introduction of the exciting light Le across the overall length of the optical fiber 1 for an optical fiber laser to be lower than the heat generation in the conventional optical fiber. According to this structure, it is possible to suppress the decrease in optical output power due to the heat generation.

In other words, in the optical fiber 1 for an optical fiber laser, it is possible to realize a flat temperature distribution by controlling the absorption characteristics of the rare earth element doped fiber to be varied along the longitudinal direction of the optical fiber 1.

Therefore, according to the optical fiber 1 for an optical fiber laser in the preferred embodiment, it is possible to easily provide a flat temperature distribution along the longitudinal direction of the optical fiber. By using the optical fiber 1 for an optical fiber laser, it is possible to realize the high output power optical fiber laser.

When the optical fiber 1 for an optical fiber laser as shown in FIG. 4C is used for constituting the optical fiber laser 71, it is possible to multiplex the exciting lights having a wavelength of 975 nm from a plurality of the excitation light sources 74 at the respective optical couplers 76, and to input the multiplexed light into the optical fiber 1 for an optical fiber laser from both sides. Further, the heat loss in the fiber (particularly at the end portion) is low.

Therefore, it is possible to provide the high output power laser exciting light L having a wavelength of 1030 to 1100 nm, with realizing that the optical conversion efficiency of the laser exciting light L to the exciting light Le is greater than 80% which exceeds the conventional limit.

Further, according to the method for fabricating the optical fiber 1 for an optical fiber laser in the preferred embodiment, it is possible to easily fabricate the optical fiber 1 for an optical fiber laser as shown in FIGS. 1 and 4C with high precision.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An optical fiber for an optical fiber laser comprising:
   a rare earth element doped core doped with a rare earth element, the rare earth element doped core being divided into a plurality of core regions along a longitudinal direction of the optical fiber, dopant concentrations of the rare earth element in each of the core regions being different from adjacent core regions; and
   a cladding formed at an outer periphery of the rare earth element doped core, the cladding having a first end and a second end,
   wherein an exciting light is inputted into both ends of the cladding to excite the rare earth element, respectively, thereby outputting a laser exciting light,
   wherein dopant concentrations of the plurality of core regions are line symmetrical with respect to a center part along the longitudinal direction of the optical fiber and are increased gradually from the first and the second ends of the cladding to the center part along the longitudinal direction of the optical fiber,
   wherein dopant concentrations of at least two of the plurality of core regions are equal, and
   wherein lengths of the at least two of the plurality of core regions are equal.

2. The optical fiber for an optical fiber laser, according to claim 1, wherein a temperature along the longitudinal direction of the optical fiber in operation is not greater than 170° C.

3. The optical fiber for an optical fiber laser, according to claim 1, wherein the core regions are provided as a combination of the rare earth element doped cores having dopant concentrations of one of 500 ppm, 700 ppm, and 1100 ppm.

4. The optical fiber for an optical fiber laser, according to claim 1, wherein a diameter of the rare earth element doped core is constant along the longitudinal direction of the optical fiber.

5. The optical fiber for an optical fiber laser, according to claim 1, wherein the dopant concentrations of the rare earth element in each of the core regions is constant in an axial direction of the optical fiber.

6. The optical fiber for an optical fiber laser, according to claim 1, wherein the dopant concentrations of the rare earth element in each of the core regions is constant along the longitudinal direction of the optical fiber.

7. The optical fiber for an optical fiber laser, according to claim 1, wherein a dopant concentration of the cladding is constant along the longitudinal direction of the optical fiber.

8. The optical fiber for an optical fiber laser, according to claim 1, wherein a diameter of a rare earth element doped region in the rare earth element doped core is constant along the longitudinal direction of the optical fiber.

9. The optical fiber for an optical fiber laser, according to claim 1, wherein the core regions are totally doped with the rare earth element and diameters of the core regions are equal to each other.

10. A method for fabricating an optical fiber for an optical fiber laser, comprising:
    preparing a plurality of divided optical fibers each of which comprising a rare earth element doped core doped with a rare earth element and a cladding formed at an outer periphery of the rare earth element doped core, and
    fusion-bonding ends of the divided optical fibers with each other such that a fusion-bonded cladding is formed having a first end and a second end, dopant concentrations of the rare earth element of the rare earth element doped core of each of the divided optical fibers being different from adjacent divided optical fibers,
    wherein dopant concentrations of the fusion-bonded divided optical fibers are line symmetrical with respect to a center part along a longitudinal direction of the fusion-bonded divided optical fibers and are increased gradually from the first and second ends of the fusion-bonded cladding to the center part along the longitudinal direction of the optical fiber,
    wherein dopant concentrations of at least two of the plurality of fusion-bonded divided optical fibers are equal, and
    wherein lengths of the at least two of the plurality of fusion-bonded divided optical fibers are equal.

11. An optical fiber laser comprising:
    an optical fiber, comprising:
      a rare earth element doped core doped with a rare earth element, the rare earth element doped core being divided into a plurality of core regions along a longitudinal direction of the optical fiber, dopant concentrations of the rare earth element in each of the core regions being different from each other; and
      a cladding formed at an outer periphery of the rare earth element doped core, the cladding having a first end and a second end;
    an optical coupler connected to an end of the optical fiber; and
    a plurality of light sources for inputting an exciting light to both ends of the cladding via the optical coupler, respectively, to excite the rare earth element, thereby outputting a laser exciting light,
    wherein dopant concentrations of the plurality of core regions are line symmetrical with respect to a center part along the longitudinal direction of the optical fiber and are increased gradually from the first and the second ends of the cladding to the center part along the longitudinal direction of the optical fiber,
    wherein dopant concentrations of at least two of the plurality of core regions are equal, and
    wherein lengths of the at least two of the plurality of core regions are equal.

12. The optical fiber for an optical fiber laser, according to claim 1, wherein mode field diameters of the plurality of core regions are equal to each other.

13. The optical fiber for an optical fiber laser, according to claim 1, wherein a dopant concentration across the center part along the longitudinal direction of the optical fiber is constant.

14. The optical fiber for an optical fiber laser, according to claim 1, wherein the center part along the longitudinal direction of the optical fiber extends toward the first and second ends of the cladding, and
wherein the center part along the longitudinal direction of the optical fiber is sandwiched in the longitudinal direction of the optical fiber by core regions having dopant concentrations and lengths respectively equal to each other.

15. The optical fiber for an optical fiber laser, according to claim 1, wherein a length of the center part along the longitudinal direction of the optical fiber is greater than a length of each of the core regions.

16. The optical fiber for an optical fiber laser according to claim 14, wherein the dopant concentrations and lengths of the core regions sandwiching the center part along the longitudinal direction of the optical fiber are respectively less than a dopant concentration and a length of the center part along the longitudinal direction of the optical fiber.

* * * * *